(12) United States Patent
Delbosco et al.

(10) Patent No.: US 12,331,851 B2
(45) Date of Patent: Jun. 17, 2025

(54) SELF-LOCKING THREADED CONNECTION PARTIALLY IN NON-LOCKING ENGAGEMENT

(71) Applicants: VALLOUREC OIL AND GAS FRANCE, Aulnoye-Aymeries (FR); NIPPON STEEL CORPORATION, Tokyo (JP)

(72) Inventors: Thimothé Delbosco, Meudon (FR); Wesley Ott, Meudon (FR); Scott Granger, Meudon (FR)

(73) Assignees: VALLOUREC OIL AND GAS FRANCE, Aulnoye-Aymeries (FR); NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/561,578

(22) PCT Filed: May 19, 2022

(86) PCT No.: PCT/EP2022/063502
§ 371 (c)(1),
(2) Date: Nov. 16, 2023

(87) PCT Pub. No.: WO2022/258334
PCT Pub. Date: Dec. 15, 2022

(65) Prior Publication Data
US 2024/0229985 A1 Jul. 11, 2024

(30) Foreign Application Priority Data
Jun. 7, 2021 (EP) .................................... 21178068

(51) Int. Cl.
*F16L 15/06* (2006.01)
*F16L 15/00* (2006.01)
*E21B 17/043* (2006.01)

(52) U.S. Cl.
CPC ............. *F16L 15/002* (2013.01); *F16L 15/06* (2013.01); *E21B 17/043* (2013.01)

(58) Field of Classification Search
CPC ....... F16L 15/06; F16L 15/002; E21B 17/042; E21B 17/043
See application file for complete search history.

(56) References Cited

U.S. PATENT DOCUMENTS

2011/0278838 A1* 11/2011 Martin .................. E21B 17/042
285/333
2016/0186899 A1 6/2016 Besse
(Continued)

FOREIGN PATENT DOCUMENTS

DE 43 45 119 C1 5/1995
WO WO 2019/076622 A1 4/2019

OTHER PUBLICATIONS

International Search Report issued Aug. 26, 2022 in PCT/EP2022/063502, filed on May 19, 2022, 3 pages.

*Primary Examiner* — David Bochna
(74) *Attorney, Agent, or Firm* — Oblon, McClelland, Maier & Neustadt, L.L.P.

(57) ABSTRACT

A threaded connection comprising: a first tubular component (1) having a first male threaded portion (16) and a second male threaded portion (17), a root width in the first male threaded portion (16) decreasing in a direction oriented a first pipe body (3), the root width being constant in the second male threaded portion (17), the second tubular component (2) comprising a female threaded zone (10) having a first female threaded portion (19) with a root width decreasing in a direction oriented towards a second pipe body (5), the connection being partially made up in a self-locking arrangement in order to provide a locking region (18) and a non-locking region (20), a female distal thread (22) of the locking region (18) has a width such that FDTW/
(Continued)

TH>=125%, in which FDTW is a tooth width of the female distal thread (22) of the locking region and TH is the tooth height of said female distal thread (22).

14 Claims, 2 Drawing Sheets

(56) References Cited

U.S. PATENT DOCUMENTS

| | | | |
|---|---|---|---|
| 2020/0325734 A1* | 10/2020 | Langford | E21B 17/043 |
| 2022/0252188 A1* | 8/2022 | Oku | F16L 15/06 |
| 2023/0066104 A1* | 3/2023 | Ott | E21B 17/043 |
| 2023/0146768 A1* | 5/2023 | Wada | F16L 15/06 |
| | | | 138/177 |
| 2023/0400126 A1* | 12/2023 | Ott | F16L 15/06 |
| 2023/0408000 A1* | 12/2023 | Owoeye | F16L 15/06 |

* cited by examiner

SELF-LOCKING THREADED CONNECTION PARTIALLY IN NON-LOCKING ENGAGEMENT

BACKGROUND

The present invention relates to a self-locking threaded connection partially in a non-locking engagement. One of the aims of the invention is to optimize reliability and cost efficiency for customers running shale gas operations, and especially to increase well integrity of such shale gas wells. The connection according to the invention is able to withstand high tension and compression loads and high torques. Therefore, the invention proposes a threaded joint for instance for casings able to withstand a severe test program of combined loads such as tension and compression, internal and external pressure, and bending.

The present invention design is particularly suited for intermediate casing, and especially for casing used for fracking.

A coupling arrangement usually comprises two pipes which are joined thanks to a coupling. Each pipe is a tubular component which comprises a pipe body with a male member, also named pin, at both ends of said pipe body. The coupling is also a tubular component but said coupling comprises a female member, also named box, at both ends. The male members and female members are provided with a respective threaded zone.

DESCRIPTION OF RELATED ART

In known fashion, it is conventional to connect male and female members by make-up of the male threaded zone with the female threaded zone, this assembly defining a connection. Therefore, a plurality of pipes can be joined using a plurality of coupling in order to form a string of tubular components.

Such a string of tubular components can be used in a well for oil or gas. A string of tubular components thus constituted may also be rotated when drilling with casing of the well. For this reason, the components must be made up together with a high torque in order to be able to transmit a rotational torque which is sufficient to allow the string to be advanced into the well and also not to break it out. When rotational movement is provided to the string to progress in the well, the rotational movement is progressively transmitted from pipe bodies with the largest diameter to the smaller ones of the string which are at the deepest location.

For conventional products, the make-up torque is generally reached thanks to cooperation by tightening of abutment surfaces provided at a free end of the pipe bodies to abut in a made-up position with a corresponding shoulder surface in the coupling. However, because the extent of abutment surfaces is a fraction of the thickness of the pipes, the critical yielding threshold of the abutment surfaces is rapidly reached when too great a make-up torque is applied, especially when it concerns pipe bodies with small diameters.

Conventionally, the threads of the male threaded zone have a pin thread crest, a pin thread root, a pin load flank, and a pin stab flank. The threads of the female threaded zone have a box thread crest, a box thread root, a box load flank, and a box stab flank.

In a wedge arrangement, the widths of the crests of the threads increase progressively for the threads of the male member or female member respectively with increasing distance from the male axial free end or female axial free end respectively. In such wedge arrangement, the widths of the roots of the threads decrease progressively for the threads of the male member or female member respectively with increasing distance from the male axial free end or female axial free end respectively.

Wedge threads are characterized by a wedge ratio, which is a non-zero difference between a Load Flank Lead LFL and a Stab Flank Lead SFL, Load Flank Lead LFL being either strictly greater or strictly smaller than Stab Flank Lead SFL, difference being calculated with the respective lead values. In locking wedge threads, LFL of both male member and female member are equal, and respectively, SFL of both pin member and box member are also equal. Thus, wedge ratios are the same for both the male member and the female member. During make-up, the male and female threads finish by locking into each other in a predictable position corresponding to a locking point.

More precisely, locking occurs for self-locking threading when both the stab flanks and the load flanks of the male threads lock against respectively the stab flanks and the load flanks of the corresponding female threads. For this reason, the make-up torque is taken by all of the contact surfaces between those flanks, i.e. a total surface area which is very substantially greater than that constituted by abutment surfaces.

Document WO2019/076622 A1 discloses a threaded connection partially in a self-locking engagement.

A major issue of those connection is also to provide enough seal performances when they are placed at their proper location in the well. Production process will expose connection to fluid with strong variation of internal pressure within the casing. Thus, connections have to optimize both torque capacity and seal performance at the same time.

There is a need for a connection with high torque, faster make-up, more economical to manufacture and lower handling damage risk. Those needs combine with a need for a connection having a good efficiency, for instance around or more than 100% of the pipe body. There is a very specific need for solution able to withstand such tension and torque requirement, for instance for shale specific requirements, such as cyclical fatigue due to rotation of the string during installation of a casing in lateral section of wells and later exposure to high internal pressure, bending and high temperature from the hydraulic fracturing process. Severe test programs including water and/or gas sealability testing, also made under bending conditions were performed.

BRIEF SUMMARY

For this reason, the aim of the invention is to provide a connection with high torque capacities, faster make-up, easy to manufacture and having low handling damage risk. The aim of the invention is also to provide such a connection having a good efficiency, for instance around or more than 100% of the pipe body.

More precisely, the invention provides a threaded connection comprising a first tubular component and a second tubular component,
the first tubular component comprising a first pipe body, a male threaded zone and a male terminal surface, the male threaded zone being arranged along a longitudinal axis (X) of the threaded connection between the first pipe body and the male terminal surface, said male threaded zone comprising a first male threaded portion and a second male threaded portion, the second male threaded portion being arranged along the longitudinal axis (X) between the first male threaded portion and the first pipe body, the first male threaded portion having threads with a first male root width and the second male threaded portion having threads with a second male root width, the first male root width decreasing in a direction oriented from the male terminal surface towards the first pipe body, the second male root width being constant along the second male threaded portion, the second tubular component comprising a second pipe body, a female threaded zone and a female terminal surface, the female threaded zone being arranged along the longitudinal axis (X) between the second pipe body and the female terminal surface, said female threaded zone comprising a first female threaded portion and a second female threaded portion, the first female threaded portion having threads with a first female root width and the second female threaded portion having threads with a second female root width, the first female root width decreasing in a direction oriented from the female terminal surface towards the second pipe body, a tooth of the female threaded zone arranged closest from the female terminal surface having a largest female thread root width of the female threaded zone, wherein the male threaded zone and the female threaded zone are partially made up in a self-locking arrangement in order to provide a locking region and a non-locking region in the threaded connection, the locking region being formed in the made-up state of the threaded connection by cooperation of the first male threaded portion and the first female threaded portion, the non-locking region being formed in the made-up state of the threaded connection by cooperation of the second male threaded portion and the female threaded zone, and wherein a female distal thread of the locking region has a width such that FDTW/TH>=125%, in which FDTW is a tooth width of the female distal thread of the locking region and TH is the tooth height of said female distal thread.

The threaded connection according to the above features provides a semi-premium connection, for instance dedicated to shale applications, having self locking threads, such that the locking threads provide a seal sufficient to seal to liquid, and advantageously also gas, but also sufficient to provide enough torque capacity. A threaded connection according to these features offers a high tension and compression efficiency without shoulder nor metal-to-metal seal. Moreover, such a threaded connection is easy to manufacture at low cost. Especially, the threaded connection according to these features can offer a tension and compression efficiency equal to 100% as per threaded and coupled connections efficiencies considering higher torque ratings.

Thanks to the locking region, the threaded connection has a thread seal and does not require a dedicated metal-to-metal sealing portion, minimizing the make-up loss. In other words, such a connection having sealing properties thanks to the locking region does not require a dedicated axial section of both the male and female members to ensure sealing properties of the threaded connection, the pipe body of the tubular elements can therefore be longer with this connection than with a connection using dedicated axial sections for sealing properties.

Moreover, the ratio between the tooth width of the female distal thread of the locking region, which is the thread of the first female portion which is the closest from the female terminal surface in the locking region, and the tooth height of said female distal thread allows a teeth width for the threads near the female terminal surface which is large enough to avoid shearing of said female teeth near the female terminal surface, as too narrow teeth threads would compromise the connection.

Such a threaded connection may comprise one or more the features below, alone or in combination.

According to an embodiment, the male threaded zone comprises a plurality of threads. According to an embodiment, the female threaded zone comprises a plurality of threads, said plurality of threads comprising the female distal thread of the locking region. According to an embodiment, each thread comprise a thread root, a thread load flank, a thread crest and a thread stab flank, the thread stab flank being oriented along the longitudinal axis toward the corresponding terminal surface and the thread load flank being oriented along the longitudinal axis away from said corresponding terminal surface. A tooth width is defined along a taper axis of the corresponding threaded zone between the thread stab flank and the thread load flank of a thread, for instance at the thread crest. A root width is defined along a taper axis of the corresponding threaded zone between the thread stab flank and the thread load flank of adjacent threads.

According to an embodiment, a width of the thread crests of the first male threaded portion increase in a direction oriented from the male terminal surface towards the first pipe body, a width of the thread crests of the second male threaded portion being constant, said width of the thread crests of the second male threaded portion presenting a minimum crest width of the male threaded zone, a male thread closest to the first pipe body presenting a minimum crest width value of the male threaded zone.

According to an embodiment, a width of the thread crests of the first female threaded portion increase in a direction oriented from the female terminal surface towards the second pipe body, a width of the thread crests of the second female threaded portion presenting a maximum crest width of the female threaded zone, a female thread closest to the second pipe body presenting a minimum crest width value of the female threaded zone.

According to an embodiment, the female distal thread of the locking region has a width such that FDTW/$WT_{max}$>=15%, in which FDTW is a tooth width of the female distal thread of the locking region and $WT_{max}$ is a maximum radial thickness of the first tubular element.

According to an embodiment, the male and female threaded zones have a taper generatrix forming a taper angle ($\theta_T$) with the longitudinal axis (X) of the threaded connection. According to an embodiment, a proximal thread of the male threaded zone closest from the first pipe body has a proximal thread root, a proximal load flank, a proximal crest and a proximal stab flank, the proximal thread root width being such that:

$$PRTW \geq \left(\frac{FDTW}{\cos\theta_T} + \frac{TH}{\tan(90 - \theta_{SF} + \theta_T)} + \frac{TH}{\tan(90 - \theta_{LF} - \theta_T)}\right) \cdot \cos\theta_T$$

In which PRTW is the proximal thread root width, FDTW is a tooth width of the female distal thread in the locking region, TH is the tooth height of said female distal thread, $\theta_T$ is the taper of the male threaded zone, $\theta_{SF}$ is a proximal stab flank angle and $\theta_{LF}$ is a proximal load flank angle.

Thanks to these features, there is no interference between the male proximal thread root and the female distal thread of the locking region during make-up operations of the threaded connection.

According to an embodiment, a taper of the male and/or female threaded zones corresponding to 2*tan(taper angle) is in the range of ⅙ to ¹/₁₈, and preferably selected in the range of ⅙ to ¹/₁₀ and even more preferably around ⅛. According to an embodiment, crests and roots of the male and female threads of the threaded zones are parallel to the taper generatrix in the locking region. According to an embodiment, crests and roots of the male and female threads of the threaded zones are parallel to the taper generatrix in the non-locking region.

According to an embodiment, a male threaded zone diameter is such that:

$$ODpb < MTZD < IDpb + 15\% \, Wpbt$$

In which ODpb is an outer diameter of the first pipe body, MTZD is the male threaded zone diameter, IDpb is an inner diameter of the first pipe body and Wpbt is the wall thickness of the first pipe body.

Thanks to these features, the locking region can be maximized, providing an important cooperation surface in the threaded connection between the male threaded zone and the female threaded zone in the locking region. Such a maximized locking region allows maximized sealing and torque bearing threads and allows for a more ridged male member, especially near the male terminal surface, which further improve the sealing properties of the threaded connection.

According to an embodiment, the difference between a male Stab Flank Lead and a male Load Flank Lead in the locking region is such that:

$$LD > SFL \cdot \sin^2(\theta_T) \cdot (\cot(\theta_T) + \tan(\theta_{SF})) \cdot (\tan(\theta_{SF} - \theta_T) + \tan(\theta_{LF} + \theta_T))$$

In which, LD is the difference between the male Stab Flank Lead and the male Load Flank Lead, SFL is the male Stab Flank Lead, $\theta_T$ is the taper of the male threaded zone, $\theta_{SF}$ is the stab flank angle of the male threads and $\theta_{LF}$ is the load flank angle of the male threads.

According to an embodiment, the difference between a female Stab Flank Lead and a female Load Flank Lead in the locking region is equal to the difference between the male Stab Flank Lead and the male Load Flank Lead. In other words, said difference between the female flank leads follow the above-mentioned rules regarding the difference between the male flank leads.

These features avoid early flank locking during make-up, the contact between the flanks in the locking region of the connection arising at the end of the screw operations between the male threaded zone and the female threaded zone, i.e at the end of the make-up operations.

According to an embodiment, the first female threaded portion is arranged between the second female threaded portion and the second pipe body along the longitudinal axis of the threaded connection.

According to an embodiment, the second female root width decreases in a direction oriented from the female terminal surface towards the second pipe body. Preferably, a wedge ratio in the first female threaded portion and the second female threaded portion is equal. Thanks to these features, the first female threaded portion and the second female threaded portion can be manufactured easily, using a single continuous manufacturing process for both female threaded portions.

According to an embodiment, the second female root width is constant along the second female threaded portion.

According to an embodiment, the first female threaded portion is arranged between the second female threaded portion and the female terminal surface along the longitudinal axis of the threaded connection.

According to an embodiment, the male threaded zone comprises a single continuous spiral such that a lead of the male stab flanks changes at a single male stab flanks changing location on the male threaded zone. Preferably, the female threaded zone comprises a single continuous spiral such that a lead of the female stab flanks changes at a single female stab flank changing location on the female threaded zone, the male stab flank changing location and the female stab flank changing location being at different locations along the longitudinal axis (X) of the threaded connection such that the locking region is defined between the male terminal surface and the closest from the male terminal surface between the male stab flank changing location and the female stab flank changing location. In this embodiment, preferably, a lead of the male load flanks remains constant along the male threaded zone and a lead of the female load flanks remains constant along the female threaded zone.

According to an embodiment, the male threaded zone comprises a single continuous spiral such that a lead of the male load flanks changes at a single male load flank changing location on the male threaded zone. Preferably, the female threaded zone comprises a single continuous spiral such that a lead of the female load flanks changes at a single female load flank changing location on the female threaded zone, the male load flank changing location and female load flank changing location being at different locations along the longitudinal axis (X) of the threaded connection such that the locking region is defined between the male terminal surface and a closest from the male terminal surface between the male load flank changing location and the female load flank changing location. In this embodiment, preferably, a lead of the male stab flanks remains constant along the male threaded zone and a lead of the female stab flanks remains constant along the female threaded zone.

According to an embodiment, the non-locking region is a first non-locking region, the locking region being located between said first non-locking region and a second non-locking region, the first non-locking region being defined by the second male threaded portion and the first female threaded portion, the second female root width being constant along the second female threaded portion, the second non-locking region being defined by the first male threaded portion and the second female threaded portion, the locking region being defined by the first male threaded portion and the first female threaded portion.

According to an embodiment, the first non-locking or the second non-locking portion is formed by engagement of the second male threaded portion and the first female threaded portion. According to an embodiment, the first non-locking or the second non-locking portion is formed by engagement of the first male threaded portion and the second female threaded portion.

According to an embodiment, the root of a proximal female thread which is closest to the second pipe body has the same root width as the root of a male thread which is closest to the first pipe body.

According to an embodiment, threads of the second male threaded portion have imperfect thread height and or vanishing thread teeth.

According to an embodiment, the female threaded zone starts as of the female terminal surface and/or the male threaded zone starts as of the male terminal surface.

According to an embodiment, the threads of the male threaded zone and the threads of the female threaded zone have a dovetail profile, such a dovetail profile avoiding jump-out.

According to an embodiment, a load flank angle α of a thread is less than 5° with a perpendicular to the longitudinal axis (X) of the threaded connection. According to an embodiment, a stab flank angle β of a thread is less than 5° with a perpendicular to the longitudinal axis (X) of the threaded connection.

According to an embodiment, both the crests of the male threads and the crests of the female threads are interfering with corresponding roots of, respectively, the female threads and the male threads in the locking region. In other words, the crests of the male threads are interfering with the roots of the female threads in the locking region and the crests of the female threads are interfering with the roots of the male threads in the locking region. According to an embodiment, both the crests of the male threads and the crests of the female threads are interfering with corresponding roots in the non-locking region. According to an embodiment, the diameter interference at the root/crest interference is between 0.0020 and 0.0030 times the first pipe body nominal outer diameter.

Thanks to these features, the threaded connection has good sealing properties in the locking region.

According to an embodiment, the threaded connection is free from any distal abutment surface, the male terminal surface being axially away from the female member, and respectively the female terminal surface being axially away from the male member.

According to an embodiment, both male and female member are free of any additional sealing surfaces beside the locking region.

According to an embodiment, the male threaded zone and the female threaded zone are made of single start threads.

According to an embodiment, the first male threaded portion comprises at least 90% of perfect threads, for instance in view of the nominal outer diameter of the first tubular component and preferably in view of the minimal outer diameter of said first tubular component. According to an embodiment, the first female threaded portion comprises at least 90% of perfects threads, for instance in view of the nominal outer diameter of the second tubular component and preferably in view of the minimal outer diameter of said second tubular component.

Such perfect threads have the same flank height along the threaded zone. Thanks to these features, the threaded connection has enough perfect threads in the locking region to ensure a good bearing efficiency of the connection and sealability.

According to an embodiment, the locking region comprises at least 90% of perfect threads. According to an embodiment, the first male threaded portion comprises at least 90% of the perfect threads of the male threaded zone. According to an embodiment, the first female portion comprises at least 90% of the perfect threads of the female threaded zone.

According to an embodiment, crests and roots of the male and female threads of the threaded zones are parallel to the taper generatrix in the locking region.

According to an embodiment, the female threaded zone is a first female threaded zone and the female terminal surface is a first female terminal surface, the second tubular component further comprising a second female threaded zone and a second terminal surface, the second female threaded zone being arranged along the longitudinal axis between the second pipe body and the second terminal surface. Such a second female threaded zone is intended to cooperate with a third tubular component, said third tubular component being similar to the first tubular component and the second female threaded zone having any of the above mentioned features to cooperate with said third tubular component in a made-up state as defined above regarding the made-up state between the first tubular component and the second tubular component.

BRIEF DESCRIPTION OF THE SEVERAL VIEWS OF THE DRAWINGS

The characteristics and advantages of the invention are disclosed in more detail in the following description made with reference to the accompanying drawings.

DETAILED DESCRIPTION

By convention, the terms "outer" or "external" and "inner" or "internal" are used to define the relative position of one element with respect to another or the orientation of such an element, with reference to a longitudinal axis X of the threaded connection, an element or a surface close to/facing the longitudinal axis X being qualified as "inner" or "internal" and an element or a surface away from/facing away the longitudinal axis X being qualified as "outer" or "external". The radial direction is defined as perpendicular to the longitudinal axis X of the threaded connection.

Figure 1:
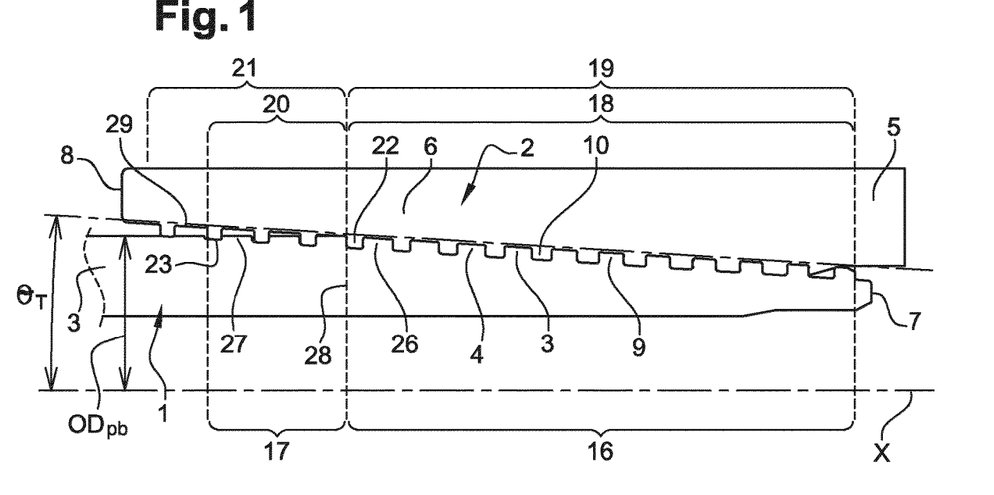
FIG. 1 is a longitudinal cross-sectional view of one half of a connection comprising a self-locking threading in accordance with the invention, in a made-up state.

The threaded connection shown in FIG. 1, hereafter named connection, comprises a first tubular component 1 and a second tubular component 2. The first tubular component 1 and the second tubular component 2 are parts of a coupling connection, which means that the first tubular component 1 comprises a first pipe body 3 and male elements 4 on both ends of said first pipe body 3 and that the second tubular element 2 comprises a second pipe body 5 and female elements 6 on both ends of said second pipe body 5. In other words, the second tubular component 2 is a coupling used to join together two first tubular components 1 thanks to the cooperation between the male elements 4 of said first tubular components 1 and the female elements 6 of said second tubular component 5. Only one first tubular component 1 and one male element 4 cooperating with one female element 6 of the second tubular component 2 are partially shown in a made-up state on FIG. 1, but the description below could be applied for the other female element (not shown) of the second tubular component 2 and another male element (not shown) of another first tubular component (not shown). Both tubular components 1, 2 are made out of steel.

In a made-up state of the connection as shown in FIG. 1, the male member 4 and the female member 6 are connected such that a longitudinal axis X of the connection is coaxial with the first tubular component 1 and the second tubular component 2, said longitudinal axis X defining an axial direction of the connection.

An end of the male member 4 opposed to the first pipe body 3 finishes in a male terminal surface 7. This male terminal surface 7 forms an axial free end of the male member 4 or pin face. The male terminal surface 7 is also a free axial surface of the first tubular component 1. An end of the female member 6 finishes in a female terminal surface 8. This female terminal surface 8 forms an axial free end of the female member 6 or box face. The female terminal surface 8 is also a free axial surface of the second tubular component 2. The male terminal surface 7 and the female terminal surface 8 are oriented radially with respect to a longitudinal axis X of the connection. None of the male terminal surface 7 and the female terminal surface 8 are placed in abutment contact at the end of make-up. In other words, the male terminal surface 7 is axially away from the second tubular component 2 and the female terminal surface 8 is axially away from the first tubular component 1.

Figure 2:
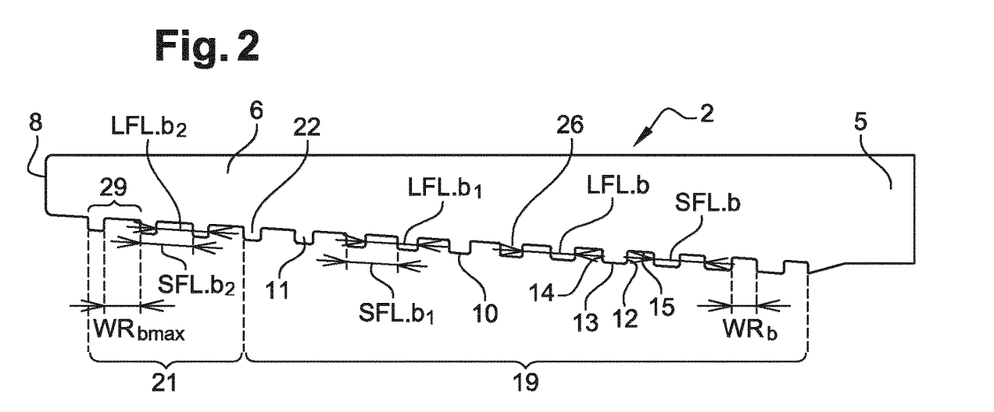
FIG. 2 is a longitudinal cross-sectional view of one half of a female member of the connection of FIG. 1.
Figure 3:
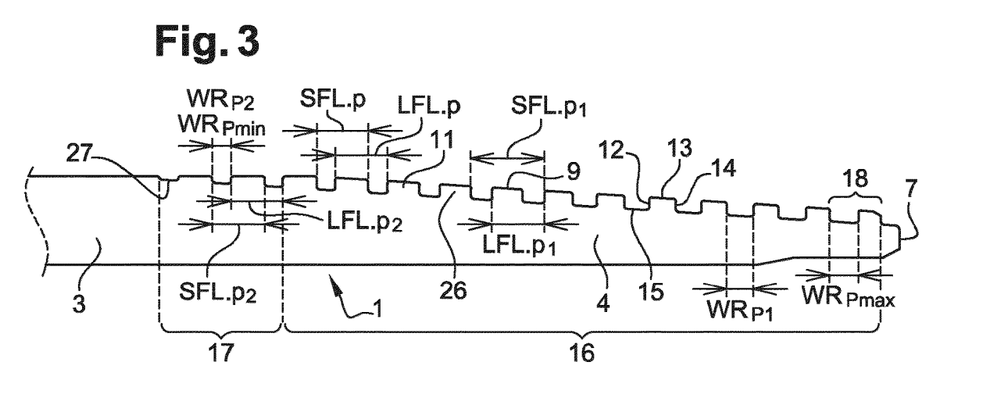
FIG. 3 is a longitudinal cross-sectional view of one half of a male member of the connection of FIG. 1.

As shown on FIGS. 1 to 3, the male member 4 is provided with a male threaded zone 9 and the female member 6 is provided with a female threaded zone 10. The male threaded zone 9 and the female threaded zone 10 cooperate for mutual connection by make-up of the two tubular components 1, 2. Threaded zones 9, 10 are respectively machined. In FIG. 1, the threaded tubular connection is shown fully made up.

According to the present invention, connection efficiency is at least of 100% of the first pipe body 3 yield strength.

The male threaded zone 9 and the female threaded zone 10 are tapered with a taper angle $\theta_T$, said taper angle $\theta_T$ being the same for both the male threaded zone 9 and the female threaded zone 10. This taper angle $\theta_T$ is an angle between a generatrix of the male threaded zone 9 and/or the female threaded zone 10 and the longitudinal axis X of the connection. The taper, corresponding to 2*tan(6T), is for instance in the range of ⅙ to ⅟₁₈, and preferably selected in the range of ⅙ to ⅟₁₀ and even more preferably around ⅛. Preferably, a taper value may be ⅛ or ⅙, corresponding respectively to taper angle $\theta_T$ of 3.6° and 4.8°.

Male threaded zone 9 and female threaded zone 10 are single start. Single start means that each of the male threaded zone 9 and the female threaded zone 10 have a respective unique and single threaded spire with no interruption, spire being a continuous helix. The male threaded zone 9 starts as of the male terminal surface 7. The female threaded zone 10 starts as of the female terminal surface 8. Each of the male threaded zone 9 and the female threaded zone 10 comprise a plurality of threads 11 formed by the threaded spire. Each thread 11 comprises a load flank 12, a crest 13, a stab flank 14 and a root 15.

The male threaded zone 9 has a first male threaded portion 16 and a second male threaded portion 17. The second male threaded portion 17 is arranged along the longitudinal axis X between the first male threaded portion 16 and the first pipe body 3. In the first threaded portion 16, an axial width of the thread root $WR_{p1}$ decreases along a direction oriented from the male terminal surface 7 towards the first pipe body 3 and an axial width of the crests increases along said direction oriented from the male terminal surface 7 towards the first pipe body 3. In the second threaded portion 17, an axial width of the thread root $WR_{p2}$ remains at a minimum constant width value $WR_{pmin}$ and the axial width of the crests remains constant at a maximum width value. A thread 18 of the male threaded zone 9 closest to the male terminal surface 7 presents a maximum axial root width value $WR_{pmax}$ of the male thread threaded zone 9.

The female threaded zone 10 has a first female portion 19 and a second female threaded portion 21. The first female threaded portion 19 has an axial width of the thread root $WR_b$ which decreases along a direction oriented from the female terminal surface 8 towards the second pipe body 5 and an axial width of the crests which increases along said direction oriented from the female terminal surface 8 towards the second pipe body 5.

In the embodiment shown on FIGS. 1 and 2, the first female threaded portion 19 is arranged along the longitudinal axis (X) between the second female threaded portion 21 and the second pipe body 5. In this embodiment, the second female threaded portion also has an axial width of the thread root $WR_b$ which decreases along a direction oriented from the female terminal surface 8 towards the second pipe body 5 and an axial width of the crests which increases along said direction oriented from the female terminal surface 8 towards the second pipe body 5. In other words, the variation of the crests and roots width of the female threaded zone 10 is constant all along said female threaded zone 10 in this embodiment. A thread 29 of the female threaded zone 10 closest to the female terminal surface 8 presents a maximum axial root width value $WR_{bmax}$ of the female threaded zone 10.

As explained below, the female threaded zone 10 and the first male threaded portion 16 have the same wedge ratio. In the female threaded zone 10 and in the first male threaded portion 16, a difference between a Stab Flank Lead SFL and a Load Flank Lead LFL in the locking region is preferably such that:

$$LD > SFL \cdot \sin^2(\theta_T) \cdot (\cot(\theta_T) + \tan(\theta_{SF})) \cdot (\tan(\theta_{SF} - \theta_T) + \tan(\theta_{LF} + \theta_T))$$

In which, LD is the difference between the Stab Flank Lead SFL and the Load Flank Lead LFL, $\theta_T$ is the taper of the threaded zone 9 or 10, $\theta_{SF}$ is the stab flank angle of the threads 11 and $\theta_{LF}$ is the load flank angle of the threads 11, said taper and flanks angles being the same in the female threaded zone 10 and the first male threaded portion 16. Such difference avoids early flank locking in the locking region 18 during make-up operations.

In the made-up state as shown on FIG. 1, the connection comprises a locking region 18 in which a first female portion 19 of the female threaded zone 10 cooperates with the first male threaded portion 16 in a self-locking arrangement and a non-locking region 20 in which a second portion 21 of the female threaded zone 10 cooperates with the second male threaded portion 17 in a non-self-locking arrangement.

In such a "self-locking" configuration, the male threads 11, like the female threads 11, have a constant lead although their crest width respectively decreases from the corresponding pipe body 3, 5 towards their respective terminal surface 7, 8 and their root width respectively increases from the corresponding pipe body 3, 5 towards their respective terminal surface 7, 8. During make-up, the male and female threads 11 finish by locking into each other in a determined position thanks to this variation in the crests and roots widths. In other words, in the made-up state as shown on FIG. 1, in the locking region 18, the load flanks 12 of the female threaded zone 10 are in contact with interference against the load flanks 12 of the male threaded zone 9 and the stab flanks 14 of the female threaded zone 10 are in contact with interference with the stab flanks 14 of the male threaded zone 9.

On the contrary, in a "non-self-locking" configuration, an axial gap remains between the load flanks 12 and/or the stab flanks 14 of the male threaded zone 9 and the female threaded zone 10.

In the locking region 18, as within the first male threaded portion 16 and the first female portion 19 there is a progressive variation of the axial crests width, and correspondingly a progressive variation of the axial roots width, a progressive axial tightening is produced between the threads 11 of the first male threaded portion 16 and the threads 11 of the first female portion 19 during make-up until a final locking position. As explained above, in such a final locking position, threads 11 of the first male threaded portion 16 are such that their stab flanks 14 and load flanks 12 lock against respectively the stab flanks 14 and the load flanks 12 of the corresponding threads 11 of the first female portion 19.

Furthermore, according to the design of the connection shown on FIG. 1, there is no radial gap between thread crests 13 and threads root 15 in the locking region 18, both between the thread crests 13 of the male member 4 and the thread roots 15 of the female member 6 and also between thread crests 13 of the female member 6 and thread roots 15 of the male member 4. Thus, the locking region 18 forms a seal by generating enough contact to trap dope and withstand high pressure. In this embodiment, crests 13 and roots 15 of the male threaded zone 9 and the female threaded zone 10 in the locking region 18 are parallel to the taper generatrix of the threaded zones 9, 10.

In order to ensure a good sealing behavior of the connection, the diameter interference at the root/crest interference is between 0.0020 and 0.0030 times the first pipe body 3 outer diameter. In a preferred embodiment, to ensure a good sealing behavior of the connection, a diameter interference at the root/crest interference is defined as greater than 0.4*((OD−2*Wtmin)*EUL in which OD is the nominal outer diameter of the first pipe body,
Wtmin is the minimal wall thickness of the first pipe body 3, said minimum wall thickness being defined for instance in API 5CT as the remaining pipe body wall*wall thickness, and
EUL is an elongation under load for a minimum grade, for instance 0.005.

In the non-locking region 20, as within the second male threaded portion 17 the axial width of the thread root $WR_{p2}$ remains constant whereas the axial width of the thread crests 13 in the second female portion 21 decreases from the locking region 18 towards the male terminal surface 7, a gap remains between the stab flanks 14 and/or the load flanks 12 if the male and female second threaded portions 17, respectively 21, in the made-up state of the connection.

Figure 4:
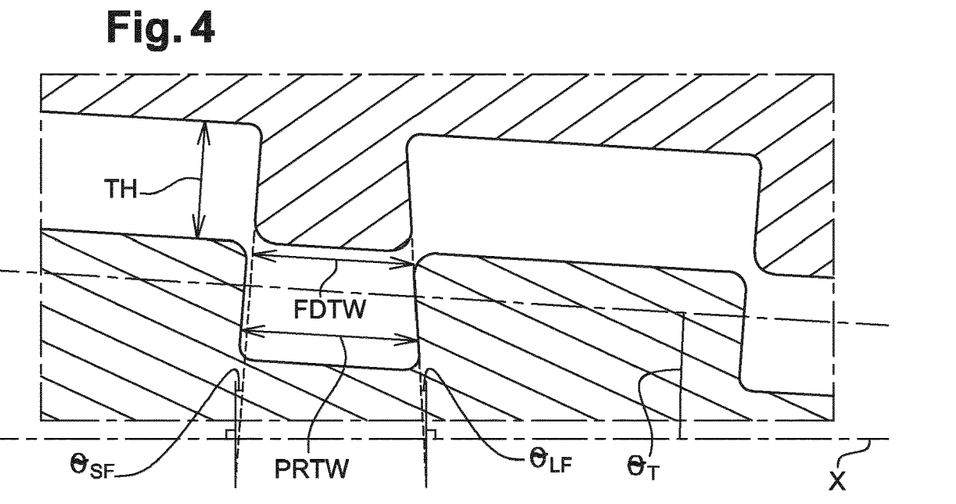
FIG. 4 is a schematic view of the threaded connection of FIG. 1 showing in detail and in a radially separate view a distal female thread in the locking region and a proximal thread of the male threaded zone during make-up operation, said threads being shown radially away in FIG. 4.

In order to avoid shearing, the thread crests 13 of the female threaded zone 10 should not be too narrow, especially for the threads 11 which are involved in the locking region 18. As shown on FIG. 4, a female distal thread 22 is such that:

FDTW/*TH*>=125% in which FDTW (for female distal tooth width) is a tooth width of the female distal thread 22 in the locking region 18 and TH (for thread height) is the tooth height of said female distal thread 22 in the locking region 18. Such a female distal thread 22 is the thread 11 of the female threaded zone 10 which is engaged in self-locking arrangement, i.e which is in the locking region 18 and consequently have in the made-up of the connection both load flank 12 and stab flank 14 in contact with interference state with corresponding load flank 12 and, respectively, stab flank 14 of the male threaded zone 9, which is the closest of the female terminal surface 8. In other words, such a female distal thread 22 is the last thread of the female threaded zone 10 in the locking region which is adjacent to the non-locking region 20. Said female distal thread 22 following the above-mentioned ratio has a crest width which is large enough to avoid shearing of the connection.

Moreover, said female distal thread 22 is preferably such that

FDTW/*WT*max>=15%, in which FDTW is the tooth width of the female distal thread 22 and WTmax is a maximum radial thickness of the first pipe body 3.

Advantageously, as shown on FIG. 4, a proximal thread 23 of the male threaded zone 9 as a root width PRTW such that:

$$PRTW \geq \left( \frac{FDTW}{\cos\theta_T} + \frac{TH}{\tan(90 - \theta_{SF} + \theta_T)} + \frac{TH}{\tan(90 - \theta_{LF} - \theta_T)} \right) \cdot \cos\theta_T$$

in which FDTW is the tooth width of the female distal thread 22, TH is the tooth height of said female distal thread 22, $\theta_T$ is the taper of the male threaded zone 9, $\theta_{SF}$ is a proximal stab flank angle of the proximal thread 23 and $\theta_{LF}$ is a proximal load flank angle of said proximal thread 23. Such a proximal thread 23 of the male threaded zone 9 ensure that there is no interference between said proximal thread 23 and the female distal thread 22 during make-up operation of the connection, allowing to screw up the male and female threaded zone 9, 10 easily.

Preferably, a male threaded zone diameter MTZD is such that:

ODpb<MTZD<IDpb+15% Wpbt

In which ODpb is an outer diameter of the first pipe body 3, MTZD is the male threaded zone diameter, IDpb is an inner diameter of the first pipe body 3 and Wpbt is the wall thickness of the first pipe body 3. Such a male threaded zone diameter MTZD allows to maximize the length of the locking region 18, providing an important cooperation surface in the connection between the threads 11 of the first male threaded portion 16 and the first female threaded portion 19, providing good sealing properties and torque bearing threads and allows for a more ridged male member, especially near the male terminal surface 7.

Advantageously and as shown in FIG. 4, threads 11 of the male threaded zone 9 and threads 11 of the female threaded zone 10 have a dovetail profile. This dovetail profile enables to avoid the risk of jump-out, which corresponds to the male threaded zone 9 and the female threaded zone 10 coming apart when the connection is subjected to large bending or tensile stresses. More precisely, the geometry of the dovetail threads 11 increases the radial rigidity of their assembly compared with threads, which are usually termed "trapezoidal" threads wherein the axial thread width reduces from the roots to the crest of the threads. Advantageously, the load flanks 12 of the threads 11 connect to the thread crests 13 and to the adjacent thread roots 15 by roundings such that these roundings reduce the stress concentration factor at the foot of the load flanks 12 and thereby improve the fatigue behavior of the connection.

Along a longitudinal section of the connection, both load flank 12 and stab flank 14 present a straight profile. Load flank 12 and stab flank 14 are respectively making negative angle α, respectively negative angle β with a direction perpendicular to the longitudinal axis X. Load flank angle value α is inferior or equal to stab flank angle value β, while being opposed and defined on opposed sides of a direction perpendicular to the longitudinal axis X. For example, angles α and β are comprised between 1° and 5°. Thus, the width of a root 15, at the bottom of the interval between two adjacent threads 11, is always the largest dimension of that thread when considering the width of a thread along the longitudinal axis X.

Figure 5:
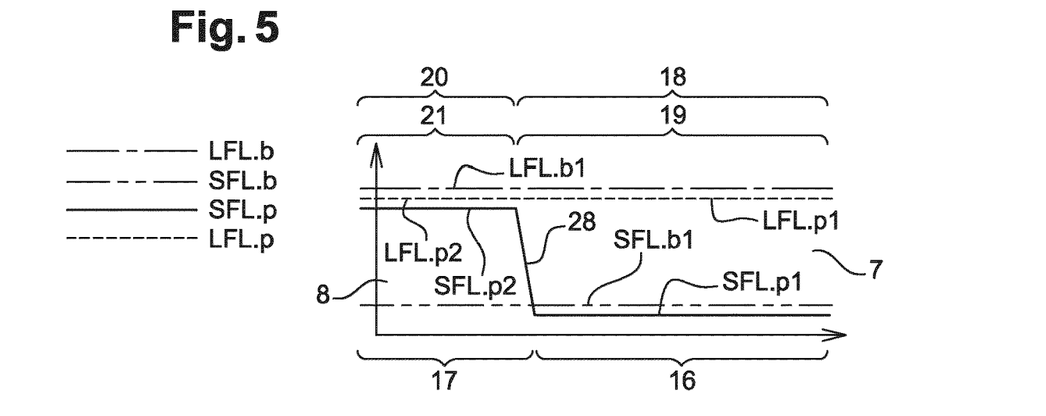
FIG. 5 is a graph according to a first embodiment of the invention, showing the evolution of the leads of the load flanks and the stab flanks for respectively the male member and female member along the threads of the male and female member in accordance with FIG. 1.

According to the first embodiment as shown on FIG. 5, a first male Stab Flank Lead SFL_p between the stab flanks 14 in the first male threaded portion 16 is constant at a value SFL_p1. A first male Load Flank Lead LFL_p1 between the load flanks 12 in the first male threaded portion 16 is also constant but at a value LFL_p1 which is different from the first male Stab Flank Lead SFL_p1. In the example of FIG. 5, LFL_p1 is strictly superior to SFL_p1. Moreover, a second male Stab Flank Lead SFL_p2 between the stab flanks 14 in the second male threaded portion 17 is constant at a value SFL_p2 and a second male Load Flank Lead LFL_p2 between the load flanks 12 in the second male threaded portion 17 remains constant at a value which is equal to the first male load flank LFL_p1. The second male Stab Flank Lead SFL_p2 is equal to the second male Load Flank Lead LFL_p2 in the second male threaded portion 17 such that the root width of the threads in said second male threaded portion 17 remains constant.

A wedge ratio of the first male threaded portion 16, which is the difference between the Load Flank Lead LFL_p1 and the Stab Flank Lead SFL_p1, for both examples are below 0.15 mm.

Within the scope of the invention, other Stab Flank Lead SFL_p1 and/or Load Flank Lead LFL_p1 values are acceptable.

Similarly, a female Load Flank Lead LFL_b between the load flanks 12 of the female threaded zone 10 is constant at a value LFL_b1 and a female Stab Flank Lead SFL_b between the stab flanks 14 of the female threaded zone 10 is also constant but at a value SFL_b1 which is different from LFL_p1, with the feature that the first female Load Flank Lead LFL_b1 is greater than the first female Stab Flank Lead SFL_b1.

Further, as represented FIG. 5, the first male Stab Flank Lead SFL_p1 and the female Stab Flank Lead SFL_b1 are equal and smaller than the respective first male Load Flank Lead LFL_p1 and female Load Flank Lead LFL_b1, which are themselves equal.

A longitudinal side 28 of the locking region 18 is defined by the location where Stab Flank Leads change on the male threaded zone 9. The male threaded zone 9 has a unique change in Stab Flank Lead value, whereas Load Flank Leads remain constant all along the male threaded zone 9.

Changes are sudden, and appear in less than one turn, preferably less than 180°.

Alternatively, male and female threaded zones 9, 10 may have constant Stab Flank Leads but the male threaded zone has a unique change in the Load Flank Lead value.

According to the present invention, only a specific number of threads 11 of each of the male and female threaded zone 9, 10 are in that specific locking configuration, and are involved in the locking region 18. The locking region 18 is away from the thread 29 of the female threaded zone 10 closest to the female terminal surface 8. In other words, at least said thread 29 is not in a locking configuration. Locking region 18 represents more than 55%; preferably more than 60%, and even preferably more than 70% of the total make up length of engaged male and female threads 11, i.e. the length of the locking region 18 plus the length of the non-locking region.

For example, the locking region 18 comprises ten to sixteen threads turns where the female threaded zone 10 in full comprises at least sixteen threads turns, and the male threaded zone 9 in full comprises at least sixteen threads turns.

The threads 11 of the male threaded zone 9 and the female threaded zone 10 comprise perfect threads 26 and imperfect threads 27.

Perfect threads 26 have their crests 13 and roots 15 parallel to the taper generatrix. Moreover, said perfect threads 26 have a constant radial height along the threaded zones 9, 10. Thus, the flanks 12 and 14 of these perfect threads 26 provide a large surface for cooperation with other threads 11.

Imperfect threads 27 are not fully formed on the connection, for instance due to the lack of available material in the wall thickness such that the crests 13 of the threads of the male and female threaded zones 9, 10 are parallel to the longitudinal axis X of the connection as material in the wall thickness become unavailable. This facilitates machining. Imperfect threads 27 are arranged in the second male threaded portion 17. Imperfect threads 27 are arranged in the female threaded zone near the second pipe body 5. Imperfect threads 27 within second male threaded portion 17 and the female threaded zone improve tension efficiency of the threaded tubular connection.

Threads 11 with the minimum root width are imperfect close to the transition with the non-threaded portions toward the pipe body 3 or 5. Imperfect threads 27 have a lower height than the regular height of the other threads, i.e. perfect threads 26, in the locking region 21.

In order to reduce machining costs, the male member 4 and the female member 6 are first blanked at the taper angle $\theta_T$ of the intended threaded zone 9 or 10, and that blanked taper angle $\theta_T$ will become the crest 13 definition of the threads. So, there is no further need to machine thread crests 13. Crests 13 according to that embodiment are parallel to the taper axis of the threaded zones 9, 10.

In order to ease make up, a surface treatment is provided to the female member 6 only, and dope is additionally placed around the male member 4 and/or the female member 6 before make-up of the connection. Alternatively, both the male member 4 and the female member 6 may be surface treated. For example, a surface treatment may be Zinc Phosphate treatment.

In a not shown embodiment, the second female threaded portion as roots and crests widths which remain constant along the longitudinal axis of the connection. The non-locking region remains defined by cooperation of the second male threaded portion and the second female threaded portion, however the axial gap between the load flanks and/or stab flanks in the non-locking region is smaller than in the embodiment described above in view of FIGS. 1 to 4. Other features of the connection remain as described above in view of said FIGS. 1 to 5.

Figure 6:
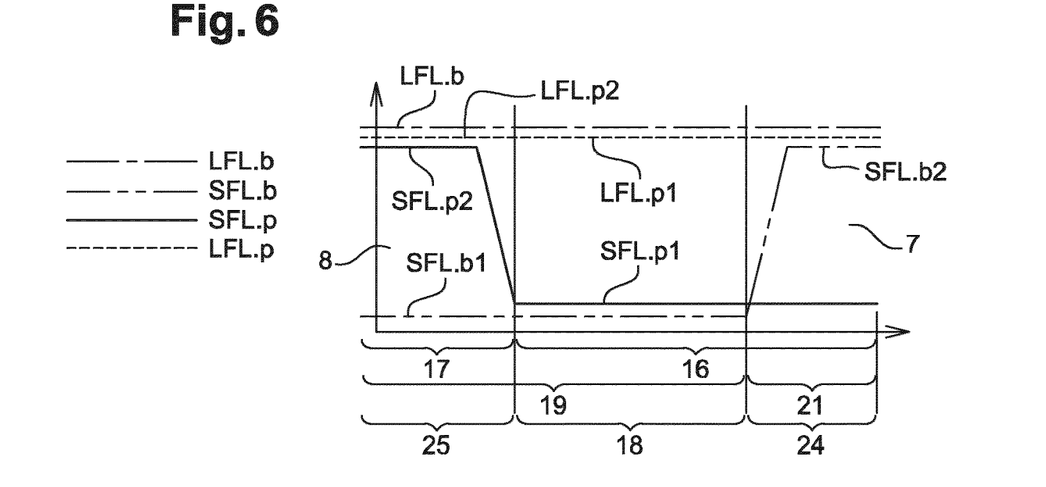
FIG. 6 according to an alternative embodiment of a connection in accordance with the invention.

Another embodiment shown of FIG. 6 differs from the embodiment described in view of FIGS. 1 to 5 in that the second female threaded portion 21 is arranged along the longitudinal axis (X) between the first female threaded portion 19 and the second pipe body 5. In this embodiment, the roots and crests of the first female portion 19 has a variation as explained above which starts from the female terminal surface 8 towards the second pipe body 5 but the second female threaded portion 21 has roots and crests widths which remain constant along the longitudinal axis (X). Thus, the female threaded zone 10 has a change location in the Stab Flank Lead SFL_b while the Load Flank Lead LFL_b in said female threaded zone 10 remains constant. A value SFL_b1 of the female Stab Flank Lead in the first female threaded portion 19 is strictly lower than a value SFL_b2 of the female Stab Flank Lead in the second female threaded portion 21, said value SFL_b2 of the female Stab Flank Lead in the second female threaded portion 21 being equal to the Load Flank Lead LFL_b in the female threaded zone 10.

The locking region 18 is formed by made-up of the first male threaded portion 16 and the first female threaded portion 19 but said locking region 18 is arranged between a first non-locking region 24 and a second non-locking region 25. The first non-locking region 24 is formed by engagement of the threads 11 of the second male threaded portion 17 with threads 11 of the first female portion 19 and the second non-locking region 25 is formed by engagement of the threads 11 of the second female portion 21 with threads 11 of the first male threaded portion 16.

In the first non-locking region 24, as the width of the roots 15 in the second male threaded portion 17 remains constant while the width of the crests 13 in the first female threaded portion 19 decreases from the female terminal surface 8 towards the second pipe body 5, the threads 11 of the second male threaded portion 17 in said first non-locking region 24 and in the made-up state of the connection are not in contact, either considering their load flanks 12 and/or their stab flanks 14, with the corresponding load flanks 12 and/or stab flanks 14 of the first female threaded portion 19. In other words, the threads 11 of the second male threaded portion 17 in the first non-locking region 24 are not in a self-locking arrangement as they have at least one of their load flanks 12 or stab flank 14 not in contact with any corresponding surface of the first female threaded portion 19, an axial clearance existing between them. Similarly, in the second non-locking region 25, as the width of the roots 15 in the second female threaded portion 21 remains constant while the width of the crests 13 in the first male threaded portion 16 decreases from the male terminal surface 7 towards the first pipe body 3, the threads 11 of the second female threaded portion 21 in said second non-locking region 25 and in the made-up state of the connection are not in contact, either considering their load flanks 12 and/or their stab flanks 14, with the corresponding load flanks 12 and/or stab flanks 14 of the first male threaded portion 16.

In a preferred embodiment, a positive clearance exists between respective male and female stab flanks 14 in the non-locking region or regions. For example, that clearance is at least 1 mm, and for example below 5 mm.

The invention claimed is:

1. A threaded connection comprising a first tubular component and a second tubular component,
the first tubular component comprising a first pipe body, a male threaded zone and a male terminal surface, the male threaded zone being arranged along a longitudinal axis (X) of the threaded connection between the first pipe body and the male terminal surface, said male threaded zone comprising a first male threaded portion and a second male threaded portion, the second male threaded portion being arranged along the longitudinal axis (X) between the first male threaded portion and the first pipe body, the first male threaded portion having threads with a first male root width and the second male threaded portion having threads with a second male root width, the first male root width decreasing in a direction oriented from the male terminal surface towards the first pipe body, the second male root width being constant along the second male threaded portion,
the second tubular component comprising a second pipe body, a female threaded zone and a female terminal surface, the female threaded zone being arranged along the longitudinal axis (X) between the second pipe body and the female terminal surface, said female threaded zone comprising a first female threaded portion and a second female threaded portion, the first female threaded portion having threads with a first female root width and the second female threaded portion having threads with a second female root width, the first female root width decreasing in a direction oriented from the female terminal surface towards the second pipe body, a tooth of the female threaded zone arranged closest from the female terminal surface having a largest female thread root width of the female threaded zone,
wherein the male threaded zone and the female threaded zone are partially made up in a self-locking arrangement in order to provide a locking region and a non-locking region in the threaded connection, the locking region being formed in the made-up state of the threaded connection by cooperation of the first male threaded portion and the first female threaded portion, the non-locking region being formed in the made-up state of the threaded connection by cooperation of the second male threaded portion and the female threaded zone,
and wherein a female distal thread of the locking region has a width such that
FDTW/TH>=125%, in which FDTW is a tooth width of the female distal thread of the locking region and TH is the tooth height of said female distal thread.

2. The threaded connection according to claim 1, wherein the female distal thread of the locking region has a width such that $$FDTW/WT_{max} >= 15\%,$$

in which FDTW is a tooth width of the female distal thread of the locking region and WTmax is a maximum radial thickness of the first tubular component.

3. The threaded connection according to claim 1, the male and female threaded zones have a taper generatrix forming a taper angle with the longitudinal axis (X) of the threaded connection, and wherein a proximal thread of the male threaded zone closest from the first pipe body has a proximal thread root, a proximal load flank, a proximal crest and a proximal stab flank, the proximal thread root width being such that:

$$PRTW \geq \left(\frac{FDTW}{\cos\theta_T} + \frac{TH}{\tan(90 - \theta_{SF} + \theta_T)} + \frac{TH}{\tan(90 - \theta_{LF} - \theta_T)}\right) \cdot \cos\theta_T$$

in which PRTW is the proximal thread root width, FDTW is a tooth width of the female distal thread in the locking region, TH is the tooth height of said female distal thread, Or is the taper of the male threaded zone, $\theta_{SF}$ is a proximal stab flank angle and $\theta_{LF}$ is a proximal load flank angle.

4. The threaded connection according to claim 3, wherein a taper of the male and female threaded zones corresponding to 2*tan(taper angle($\theta_T$)) is in the range of 1/6 to 1/18, and wherein crests and roots of the male and female threads of the threaded zones are parallel to the taper generatrix in the locking region.

5. The threaded connection according to claim 4, wherein a taper of the male and female threaded zones corresponding to 2*tan(taper angle ($\theta_T$)) is in the range of 1/6 to 1/10.

6. The threaded connection according to claim 4, wherein a taper of the male and female threaded zones corresponding to 2*tan(taper angle($\theta_T$)) is 1/8.

7. The threaded connection according to claim 1, wherein the difference between a male Stab Flank Lead and a male Load Flank Lead in the locking portion is such that:

$$LD > \cdot \sin^2(\theta_T) \cdot (\cot(\theta_T) + \tan(\theta_{SF}))(\tan(\theta_{SF} - \theta_T) + \tan(\theta_{LF} + \theta_T))$$

in which, LD is the difference between the male Stab Flank Lead and the male Load Flank Lead, SFL is the male Stab Flank Lead, $\theta_T$ is the taper of the male threaded zone, $\theta_{SF}$ is the stab flank angle of the male threads and $\theta_{LF}$ the load flank angle of the male threads.

8. The threaded connection according to claim 1, wherein the first female threaded portion is arranged between the second female threaded portion and the second pipe body along the longitudinal axis (X) of the threaded connection.

9. The threaded connection according to claim 1, wherein the first female threaded portion is arranged between the second female threaded portion and the female terminal surface along the longitudinal axis (X) of the threaded connection.

10. The threaded connection according to claim 9, wherein the male threaded zone comprises a single continuous spiral such that a lead of the male stab flanks changes at a single male stab flanks changing LFDlocation on the male threaded zone, and the female threaded zone comprises a single continuous spiral such that a lead of the female stab flanks changes at a single female stab flank changing location on the female threaded zone, the male stab flank changing location and the female stab flank changing location being at different locations along the longitudinal axis (X) of the threaded connection such that the locking region is defined between the male terminal surface and the closest from the male terminal surface between the male stab flank changing location and the female stab flank changing location, and wherein a lead of the male load flanks remains constant along the male threaded zone and a lead of the female load flanks remains constant along the female threaded zone.

11. The threaded connection according to claim 9, wherein the male threaded zone comprises a single continuous spiral such that a lead of the male load flanks changes at a single male load flank changing location on the male threaded zone, and the female threaded zone comprises a single continuous spiral such that a lead of the female load flanks changes at a single female load flank changing location on the female threaded zone, the male load flank changing location and female load flank changing location being at different locations along the longitudinal axis (X) of the threaded connection such that the locking region is defined between the male terminal surface and a closest from the male terminal surface between the male load flank changing location and the female load flank changing location, and wherein a lead of the male stab flanks remains constant along the male threaded zone and a lead of the female stab flanks remains constant along the female threaded zone.

12. The threaded connection according to claim 9, wherein the non-locking region is a first non-locking region, the locking region being located between said first non-locking region and a second non-locking region, the first non-locking region being defined by the second male threaded portion and the first female threaded portion, the second female root width being constant along the second female threaded portion, the second non-locking region being defined by the first male threaded portion and the second female threaded portion, the locking region being defined by the first male threaded portion and the first female threaded portion.

13. The threaded connection according to claim 1, wherein the root of a female threaded zone which is closest to the second pipe body has the same root width as the root of a male threaded zone which is closest to the first pipe body.

14. The threaded connection according to claim 1, wherein threads of the second male threaded portion have imperfect thread height and or vanishing thread teeth.

* * * * *